May 12, 1959 H. N. CROOKS 2,886,799

STATIC MAGNETIC DELAY-LINE

Filed June 2, 1952 3 Sheets-Sheet 1

INVENTOR
Horatio N. Crooks
BY Morris [signature]
ATTORNEY

INVENTOR
Horatio N. Crooks
BY Morris A. Rabkin
ATTORNEY

May 12, 1959 H. N. CROOKS 2,886,799

STATIC MAGNETIC DELAY-LINE

Filed June 2, 1952 3 Sheets-Sheet 3

INVENTOR
Horatio N. Crooks
BY Morris A. Rabkin
ATTORNEY

United States Patent Office 2,886,799

Patented May 12, 1959

2,886,799

STATIC MAGNETIC DELAY-LINE

Horatio N. Crooks, Haddonfield, N.J., assignor to Radio Corporation of America, a corporation of Delaware Application June 2, 1952, Serial No. 291,232

21 Claims. (Cl. 340—174)

This invention relates to computers and to a static magnetic storage therefor; and more particularly to a static magnetic delay line or array in which a matrix of information can be stored and also shifted selectively along columns or rows.

Large scale electronic computers use various types of storage or memory devices. These devices provide a temporary or permanent storage of information until required in the computer operations. Among those that have been developed is the static magnetic delay line. The latter type of memory is described in some detail in the following publications: "Magnetic Delay-Line Storage" by An Wang; Proceedings of the I.R.E., volume 39, No. 4, April 1951; "Static Magnetic Memory" by Kincaid et al., Electronics, January 1951.

The static magnetic delay line contains a large number of stationary magnetic elements serially coupled in a line or in an array. The direction of residual magnetism in the magnetic elements or cores provides a convenient medium for storing information encoded in the binary number system. Thus, the positive and negative directions of magnetism in each core may represent an information bit such as "1" and "0." The characteristics of the magnetic cores are such that the residual magnetism does not change unless an opposing magnetizing force is applied to the core. This stable character of the magnetic cores is the result of the hysteresis characteristic of the magnetic material used. As discussed in the publications cited above, the desired hysteresis graph is a substantially rectangular loop. As a result, a magnetomotive force greater than some critical value is required to change the flux density in a magnetic element to a saturation value. With removal of the magnetizing force, the residual magnetism is essentially the same as the saturation value. To reverse the polarity of magnetism, a magnetomotive force in the opposite direction is applied, which force is also greater than the critical value. If a magnetizing force is applied which is less than the critical value, substantially no change in the residual magnetism is produced. Thus, a magnetic core has two states of substantial stability.

The information to be stored may be read into a magnetic core at one end of the delay line. This is done by means of an input coil on the first core and an appropriate signal through the input coil to produce a change of flux in the core. The core is thus magnetized in a direction representative of the information. The direction of magnetism or polarity is transferred serially along the cores as the information is read in. The means for this comprises an output and input coil on each core. The output coil of each core is coupled to the input coil of the succeeding core in the line by a circuit permitting only unidirectional transfer or advance of information from one core to the next. The output coil detects any reversal in magnetic polarity in its core; the change in flux inducing a voltage in the coil. If the resulting current has a direction consistent with that of the coupling circuit, it is transmitted to the input coil of the succeeding core producing a change in magnetic flux and a turnover in polarity of that core.

The means for actuating the transfer or advancing operation comprise advancing coils on each core connected to advancing signal lines. A signal pulse sent through an advancing line changes the polarity of a core connected to the line where its previous condition permits. The change in magnetism is transmitted as a signal to the succeeding core, which is in turn magnetized with the same polarity that the preceding core had before the change. Thus, information, as represented by the magnetized state of the cores, can be advanced serially along the line in a single direction which is limited by the coupling circuits.

When desired, information can be read out of the delay line by advancing signals. These signals transfer the stored information along the line of cores to the output end where it is removed in the form of representative signals induced in an output coil on the last core. Thus, in the usual delay line the information may be read in at one end of the line and read out at the other end.

The unidirectional transfer characteristic of the coupling circuit in the magnetic delay line described is necessary in order that the transfer operation can be controlled. However, the utility of this type of delay line is limited by the single direction of transfer. Information can only be read into the line at one end and read out at the other end. Likewise, it is difficult to perform any operation on the stored information, such as, to modify it or to use a portion in one way and another portion in a different way in view of the unidirectional transfer limitation. A plurality of delay lines can be used to store information arranged in a plurality of columns. However, because the delay lines are independent of each other, it is not readily possible to change the relative arrangement of the information by means of the delay lines themselves.

It would be desirable to provide a parallel series of delay lines with a cross-coupling that would permit transverse transfer of information across the lines. Thus, information could be transferred multidirectionally, and the groups of information stored in the delay lines could be rearranged relative to each other. Versatility would be added to the ordinary delay line since it could then be used to rearrange the information in addition to and simultaneously with its storage function. For example, several columns of information may be rearranged to a few rows, or a few columns to several rows. In this way, excessive duplication of expensive information handling devices may be eliminated, and existing devices may be adapted to each other.

It is, therefore, an object of this invention to provide a static magnetic delay line having increased functions with a relatively small addition in structure.

Another object is to provide a simple delay line having a multidirectional mode of operation.

Still another object is to provide a novel coupling for the magnetic cores of a plurality of static magnetic delay lines which will permit multidirectional transfer of information along the lines.

Yet another object is to provide a novel arrangement of static magnetic delay lines whereby information in the form of columns may be converted to the form of rows.

These and other objects of this invention are achieved by providing a plurality of magnetic storage cores arranged in columns and rows, i.e., a matrix. Additional magnetic cores are used as transfer cores. A transfer core is placed between each adjacent pair of storage cores in the columns and rows, and it is coupled to the storage cores by unidirectional transfer circuits. Thereby, a series of static magnetic delay lines are produced: One in each column, and one in each row.

In one embodiment of the invention, each of the storage cores is coupled to one advancing line and each of the transfer cores to another advancing line. By means of switches in each of the transfer circuits, the direction of transfer may be selected and controlled so that either of the delay lines formed along the columns of cores or those along the rows of cores are active. Activating the transfer circuits coupling the columns of cores permits entry of information into the columns. Operation of the switches then deactivates the delay lines along the columns and activates those along the rows. The information can then be read out of the rows of cores.

In another embodiment, each of the storage cores is coupled to one advancing line, each of the column transfer cores to a second advancing line, and each of the row transfer cores to a third advancing line. Advancing signals are applied to the first advancing line, and advancing or blocking signals are alternatively applied by means of a switch to the second and third lines. With advancing signals applied to the second line and blocking signals to the third line, transfer of information is along the column delay lines, the row delay lines being held idle. Operation of the switch directs advancing signals to the third advancing line and blocking signals to the second line. This changes the direction of transfer and the row delay lines are made active with the column delay lines blocked.

The invention may be best understood by reference to the following description and the accompanying drawings in which.

Figure 1:
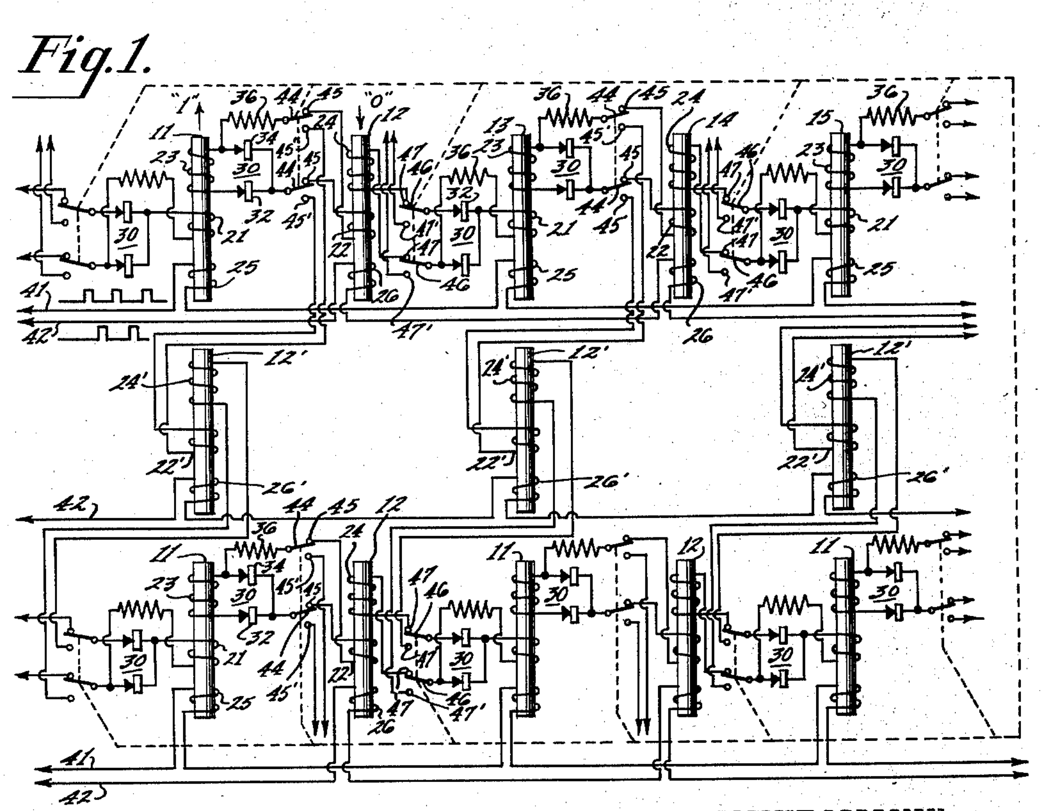
Figure 1 shows diagrammatically a static magnetic delay line embodying the invention.

Referring to Figure 1, a static magnetic delay line is formed by a plurality of serially connected magnetic cores 11, 12, 13, 14, 15 (considering only the top row for the present). Alternate cores have an input coil 21 or 22, an output coil 23 or 24 and an advancing coil 25 or 26. The output coil 23 or 24 of one core is linked to the input coil 22 or 21 respectively, of the succeeding core by an appropriate transfer circuit 30. One rectifier 32 is placed in series with, and another 34 is placed across the leads of the transfer circuits 30 and a resistor 36 is also placed in series with leads in each one of the circuits for a purpose which will be more apparent shortly. The advancing coils 25 or 26 of alternate cores are connected respectively to one of two advancing lines 41, 42 for receiving advancing current pulses of positive polarity as shown in the drawing. (The structural elements described in this paragraph constitute a prior art delay line as described in the publications cited above. The switches, other cores and circuits are described below.)

The delay line operates as follows: Consider the condition where the first core 11 is storing a "1" by means of a positive residual magnetism and the second core 12, a "0" by means of a negative residual magnetism, and the switches 44, 46 are connected to the upper contacts 45, 47 as indicated in Figure 1. If a large positive pulse is applied to the first advancing line 41, the magnetizing force produced by the current in the advancing coil 25 shifts or turns over the polarity of the first core 11 to a negative state. Along with that turnover, the change in flux in the magnetic core induces a large positive voltage in the output winding 23 of the first core. The resulting current in the ouput winding flows through the serially connected rectifier 32 and the input coil 22 of the second core 12 and back through the resistor 36, and produces a large magnetizing force in that core 12 changing the polarity from negative to positive. It can be seen that the advancing pulse transfers the digit "1" stored in the first core 11 to the second core 12.

The purpose of the rectifiers 32, 34 is to isolate the transfer from the first core 11 to the second core 12. When the second core 12 is shifted from a negative to a positive polarity, a negative voltage is produced in its output winding 24. However, that voltage does not produce any effect on the input coil 21 of the third core 13, because the resulting current is blocked by the series rectifier 32. Thus, the third core 13 is unaffected by the transfer from the first to the second core. At the same time that the transfer is taking place from the first core, a corresponding transfer is taking place from the third core 13 to the fourth core 14 and so on down the line of cores caused by that same advancing pulse applied to the odd-numbered cores through the first line 41. If a core is in a negative state when it received the advancing pulse, its polarity will not be turned over. Thus, the immediately succeeding core remains unchanged. This in effect produces a transfer of the negative polarity to the succeeding core which is negative to start with.

The effect of a positive advancing pulse in the first line 41 is to transfer all of the digits stored in the odd-numbered cores to the even-numbered cores. In a similar manner, positive pulses through the second advancing line 42 transfer the digits stored in the even-numbered cores to the succeeding odd-numbered cores. The purpose of the shunt rectifier 34 and resistor 36 is as follows: When the second core 12 receives its advancing pulse, a voltage is also induced in its input coil 22. In order to prevent any transfer effect on the previous core 11, a rectifier 34 is shunted across the input coil leads, and the resulting current is short circuited through that rectifier 34 and dissipated in the resistor 36.

The digits are stored in alternate cores of the delay line, e.g. the odd numbered cores. The succeeding alternate cores, the even-numbered cores, are originally in "0" condition, i.e. negatively polarized, in order that they may receive the digit to be transferred from the preceding core; these function as transfer cores. The first advancing pulse transfers the stored digits, "1" or "0," to the succeeding cores and at the same time zeroes the first set of alternate cores. The second advancing pulse then transfers the digits to the first set of cores one position down the line. Thus, a complete cycle or pair of pulses will transfer each digit stored in one of a pair of cores to the corresponding one of the succeeding pair of cores. It is apparent that during the absence of such advancing pulses, the digits are stored in the cores through the medium of the residual magnetism and a substantially permanent storage is produced.

As shown in Figure 1, two transverse series of delay lines are provided by a single set of magnetic storage cores. The cores are arranged in columns and rows to form a matrix. This is not necessarily the actual physical arrangement of the cores; but rather the operational effect produced by coupling the cores in the manner to be described. This terminology permits a simpler description.

Each column and row of the matrix of cores constitutes a delay line in the manner described above. Considering the first row, there is a series of storage cores 11, 13, 15 and a series of transfer cores 12, 14, one transfer core being located between each adjacent pair of storage cores. This arrangement is repeated for each row of cores. Each of the cores 11, 12 has an output 23, 24, an input 21, 22 and an advancing 25, 26 winding or coil. The cores 11, 12 in each row are coupled serially by the same type of unidirecitonal circuit 30; each consisting of a series 32 and a shunt 34 rectifier and a resistor 36 linking output and input coils of adjacent cores.

The delay lines formed along the rows may be coupled by a series of delay lines formed along the columns. Each adjacent pair of storage cores 11 in the same column has a transfer core 12' between them, in the same manner as in the rows of cores. Similarly, the cores in a column are coupled by the same type of unidirectional circuit. A duplicate set of output and input coils may be provided each core as well as duplicate coupling circuits, as disclosed in my patent application, Serial No. 291,231, entitled "Bidirectional Magnetic Delay Line," filed June 2, 1952. However, as shown in the drawing, the same arrangement of coils and circuits 30 used for the storage cores 11 in the rows may be used for the column storage cores 11. The output coil 23 of each storage core in the matrix is connected through a single unidirectional transfer circuit 30 and switches 44, 45 to the input coils 22, 22' of the succeeding transfer cores 12, 12' in the same row and column. Similarly, the input coil 21 of each storage core 11 is connected through a single unidirectional circuit 30 and switches 46, 47 to the output coils 24, 24' of the preceding transfer cores 12, 12' in the same row and column.

Switches 44, 46 are provided in each unidirectional circuit 30 so that the coupling circuits are completed in either the rows or in the columns by means of the upper 45, 47 or lower 45', 47' sets of fixed contacts. One set of fixed contacts 45, 45' are located in the leads of the input coils 22 or 22' of the transfer cores, and the other set of fixed contacts 47, 47' in the leads of the output coils 24 or 24' as shown. Double-throw switches are shown in the drawing, but it is apparent that a single-throw switch in one of the leads to each of the coils is sufficient. The switches may be formed as the contacts of a multiple-contact electromechanical relay which permits simultaneous opening (closing) of the row circuits through the upper contacts 45, 47 and closing (opening) of the column circuits through the lower contacts 45', 47'. Since mechanical relays are inherently slow in operation it may be desirable to use electronic switches in any application in which speed is an important factor. However, the type of switch means is not material to the invention so long as it permits activation of one set of transfer circuits and simulataneous blocking of the transverse circuits.

Each storage core 11 of the matrix has its advancing coil 25 connected to the first advancing line 41, and the advancing coil 26, 26' of each transfer core 12, 12' is connected to the second advancing line 42. The operation of each row delay line is the same as previously described for the first row when the row transfer circuits are closed and the column circuits are open. A cycle of advancing pulses transmitted by the two advancing lines 41, 42 actuates each row delay line simultaneously and drives the information along the row transfer circuits 30 and the transfer cores 12 moving the information one storage core down the row delay lines. Actuation of the relay in response to an appropriate instruction signal closes the column transfer circuits 30 through the lower contacts 45', 47' and opens the row circuits. Each cycle of advancing pulses then moves the information one storage core down the column delay lines through the column transfer cores 12'. With the column transfer circuits open, the column delay lines are idle, and only the row transfer circuits are operating. There is no effect produced on the column transfer cores 12' or circuits by the operation of the row delay lines. Also, the row delay lines do not affect each other, although they may be actuated simultaneously through the same advancing lines 41. The relative independence of the delay lines likewise exists with the row transfer circuits open, since the matrix arrangement is symmetrical.

As indicated, the information is stored in the alternate cores of the delay line, namely the storage cores 11. The other alternate cores 12, hold the information temporarily during each advancing-pulse cycle. The transfer core 12, 12' and unidirectional circuits 30 may be considered as forming a transfer path coupling adjacent storage cores 11. Each pair of advancing pulses advances the information to the next storage cores and leaves the transfer cores in a zeroed condition. The switches are operated when the information is in the storage cores, which puts the information in the delay lines now activated.

Figure 2:
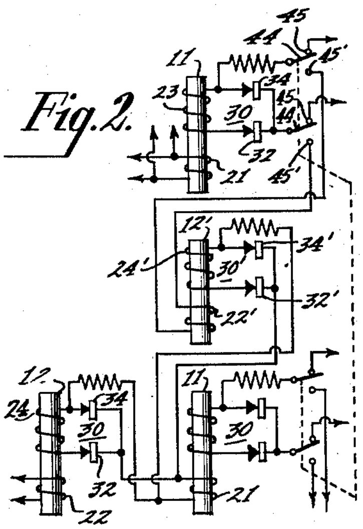
Figures 2 and 3 are circuit diagrams of modifications of the embodiment of the invention shown in Figure 1.

A diagram of an alternative coupling circuit for the embodiment just described is shown in Figure 2. One of the sets of switches 44, 46, may be eliminated by connecting two unidirectional coupling circuits to the input 21 or output 23 coil of each storage core. Thus, as shown in Figure 2, the input coil 21 of each storage core 11 may be coupled directly to the output coils 24, 24' of the preceding transfer cores 12', 12 in the same column or row. Instead of using the second set of switches 46 (as in Figure 1) to isolate the row and column transfer cores 12, 12', a pair of rectifiers 32, 34, 32', 34' is placed in the circuit at the output coil 24, 24' of each of the transfer cores 12, 12'. Currents induced in either of the output coils 24 (24') are blocked or short circuited by the rectifiers 32', 34' (32, 34) at the other output coil 24' (24) in the same way as are currents induced in the input coil 21 of the storage core 11. The advancing coils are omitted from Figure 2 to simplify the drawing.

Figure 3:
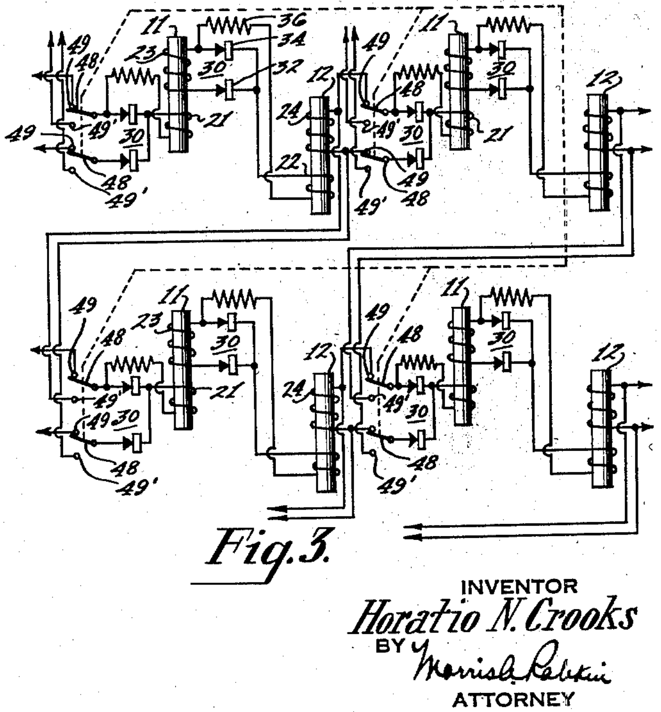

A circuit diagram of another arrangement for the present invention is shown in Figure 3. With one set of switches, the transfer operation along the columns may be isolated from the transfer along the row delay lines. Therefore, the same set of transfer cores may be used for both the row and the column delay lines eliminating the idle transfer cores. Magnetic storage cores 11 are arranged in rows and column as in the previous embodiments and have wound on them an output 23 and an input 21 coil. Each storage core output coil 23 has unidirectional circuit elements connected to its leads, namely, a series 32 and a shunt 34 rectifier and a resistor 36. Each input coil 21 has unidirectional circuit elements connected to its leads as well as the movable contacts 48 of a switch.

This arrangement differs from that of Figure 1 in that only a single transfer core 12 is used between a storage core 11 and the succeeding storage cores in the same row and column. The transfer cores 12 are the same as those in Figure 1 and are wound with an output 24 and an input 22 coil. The leads of the output coil 24 are connected to a set of fixed contacts 49, 49' of the switches at the input coils 21 of the succeeding storage cores 11 in the same row and column. The input coil 22 of each transfer core 12 is connected to the output coil 23 of the preceding storage core 11. As seen in the circuit diagram of Figure 1, advancing coils are wound on each of the cores, with those on the storage cores connected to a first advancing line and those on the transfer cores connected to a second advancing line. The advancing coils and lines are omitted from Figure 3 to simplify the presentation.

This embodiment operates in the same manner as those previously described. When the switches 48 are in the up position, the transfer circuits are completed through contacts 49, and transfer of information is to the right along the rows, and when they are in the down position transfer is downward along the columns through contacts 49'. The transfer along each delay line whether formed by the rows of storage cores or by the columns of storage cores is isolated from and unaffected by the simultaneous transfer along any of the other parallel delay lines.

Figure 4:
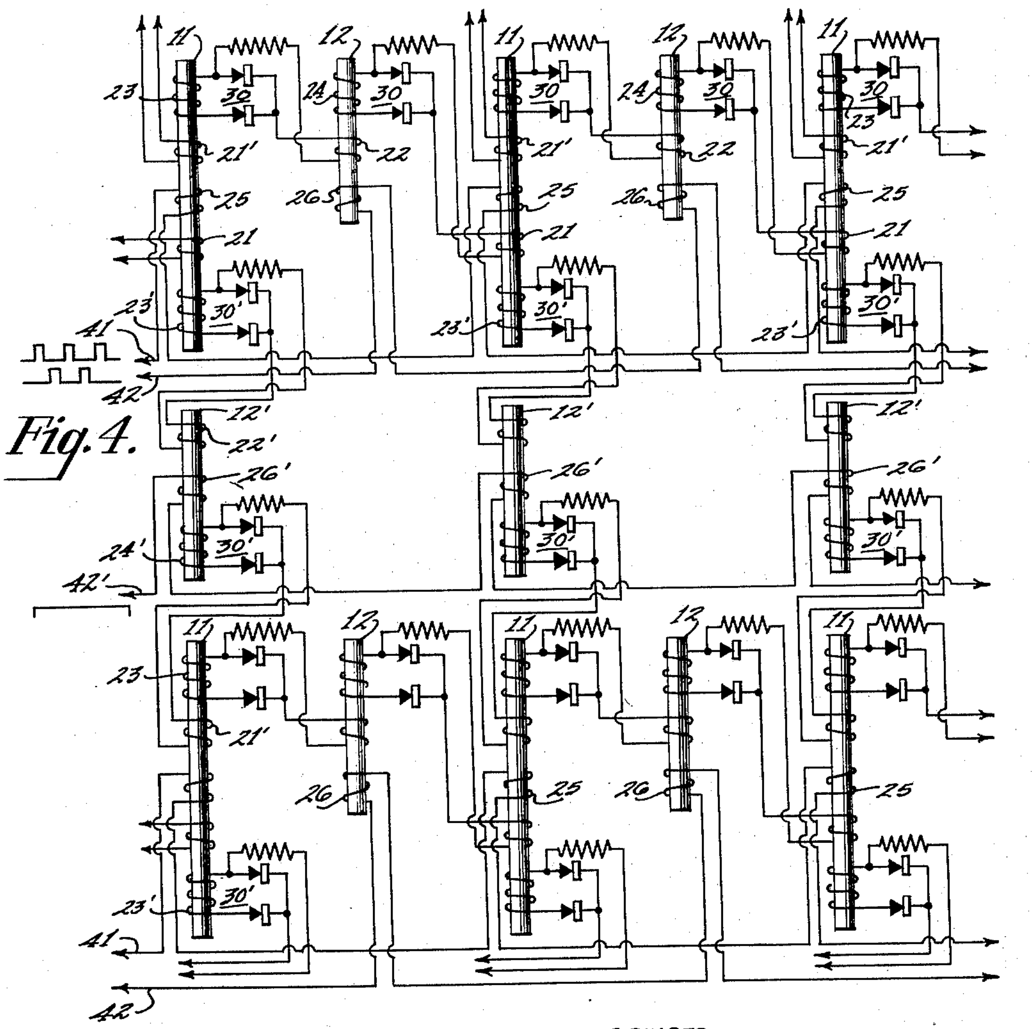
Figure 4 is a circuit diagram of another embodiment of the invention.

Figure 4 is a circuit diagram of another embodiment of the invention in which a different control and isolating arrangement is used. As in the Figure 1 embodiment, a plurality of magnetic storage cores 11 are arranged in columns and rows to form a matrix, and a magnetic transfer core 12, 12' is coupled between each adjacent pair of storage cores. Each storage core is wound with two output 23, 23' and two input 21, 21' coils, and each transfer core 12, 12' has one output 24, 24' and one input 22, 22' coil. The first output coil 23 of each storage core 11 is connected by means of a unidirectional circuit 30 to the input coil 22 of the succeeding transfer core 12 in the same row. The first input coil 21 is connected by means of a unidirectional circuit 30 to the output coil 24 of the preceding transfer core 12 in the same row. Similarly, the second output 23′ and input 21′ coils of each storage core 11 are connected by means of unidirectional circuits 30′ to the input 22′ and output 24′ coils of corresponding transfer cores 12′ in the same column.

Each of the magnetic cores 11, 12, 12′ has an advancing coil 25, 26, 26′. The advancing coils 25 on the storage cores 11 are connected to a first advancing line 41, those on the row transfer cores 12 to a second advancing line 42, and those on the column transfer cores 12′ to a third advancing line 42′. The row and column delay lines are isolated from each other by means of the type of signal sent through the second 42 and third 42′ advancing lines. If a steady current of appropriate polarity and magnitude is applied to the advancing coils 26′ of the column transfer cores 12′, each of those cores is magnetized to a negative condition of saturation and maintained in that condition. Due to the magnitude of the steady current, the cores 12′ are essentially unaffected by transfer current pulses from the preceding storage cores 11 which tend to change the polarity of the transfer cores. Since the polarity of the column transfer cores 12′ does not change, no current pulses are sent out to the succeeding storage cores 11. Thus, the transfer paths formed by the column transfer cores 12′ and the unidirectional circuits 30′ coupled thereto may be considered to be blocked or deactivated for purposes of information transfer.

While the column transfer cores 12′ are held idle by a steady current, information transfer can take place along the row transfer paths, in the usual manner, by means of current pulses alternately sent through the first 41 and second 42 advancing lines. In order to transfer information along the column delay lines, a steady current is set through the second advancing line 42 and current pulses are applied alternately to the first 41 and third 42′ advancing lines. The column transfer paths are thereby placed in an active condition for transfer and the row paths are in an idle condition.

The steady current which holds the transfer cores 12, 12′ idle should be in the same direction as the advancing pulses. Under such circumstances, the idle cores are negatively magnetized or zeroed, and in condition to receive information from the storage cores 11 when they are reactivated.

Figure 5:
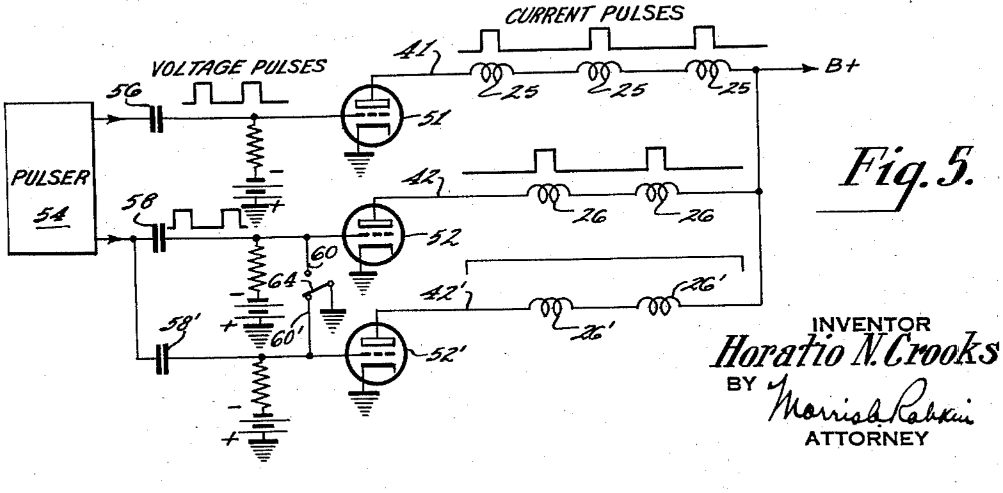
Figure 5 is a circuit diagram of a system for controlling the transfer operation in the embodiment of the invention shown in Figure 4.

There is shown in Figure 5 a circuit suitable for directing a steady blocking current into the second 42 and third 42′ advancing lines as well as advancing current pulses into all three lines 41, 42, 42′. Three tubes 51, 52, 52′ are connected to the two outputs of an ordinary pulser 54. The latter may be arranged in a conventional manner to produce two trains of square-wave voltage pulses, which are time-displaced.

A suitable pulser arrangement (not shown) may comprise a signal generator having its output connected to the primary of a saturable core transformer. The secondary of the transformer is condenser coupled to a pair of one-shot multivibrators in parallel; one of which is arranged to be responsive to the positive peaks of the output from the transformer secondary for producing positive square-wave pulses, and the other to the negative peaks also for producing positive square-wave pulses. Thus, two trains of time-displaced, positive square-wave pulses are produced by the two one-shot multivibrators corresponding to the time-displaced positive and negative wave peaks from the transformer secondary.

One of the pulser outputs is coupled by means of a condenser 56 to the grid of the first tube 51 which may be negatively biased to cut-off potential. The first advancing line 41 connects the anode of the first tube 51 to a source of operating potential. The first series advancing coils 25, in series in the line, function as an anode load. The positive voltage pulses applied to the grid overcome the grid bias and the tube conducts. Conduction in the tube produces a corresponding train of current pulses in the first advancing line 41.

The other pulser output is connected to the grids of the second 52 and third 52′ tubes by coupling condensers 58, 58′ in parallel. These tubes may also be biased to cut-off. A second path 60, 60′ is provided each of these grids to shunt them to ground. A switch 64 connected to ground is provided for alternatively changing the bias of the grids to ground potential. The anodes of the second 52 and the third 52′ tubes are connected to an operating potential by the second 42 and third 42′ advancing lines respectively, with the corresponding advancing coils as loads.

Considering the condition shown in the drawing: The switch 64 is operated to open the path to ground 60 of the grid of the second tube 52, and to complete the bias shunt 60′ of the third tube 52′. The second tube 52 remains negatively biased to cut-off, and the train of positive voltage pulses applied to the grid result in a corresponding train of current pulses in the second advancing line 42. As the first and second train of voltage pulses are time-displaced, so the corresponding current pulses are time-displaced. The third tube 52′, which is continuously biased to conduction through the switch 64, produces a steady current in the third advancing line 42′. Reversing the switch 64 changes the type of current flowing in the second 42 and third 42′ advancing lines; the second line 42 then has a steady blocking current, and the third line 42′ has a pulsating advancing current.

The switch shown may be the contacts of an electromechanical relay which responds to an appropriate instruction signal. For faster operation, an electronic switch may be substituted. For example, the output of a bistable multivibrator may be used to control and change the bias potentials at the grids of the second and third tubes.

Figure 6:
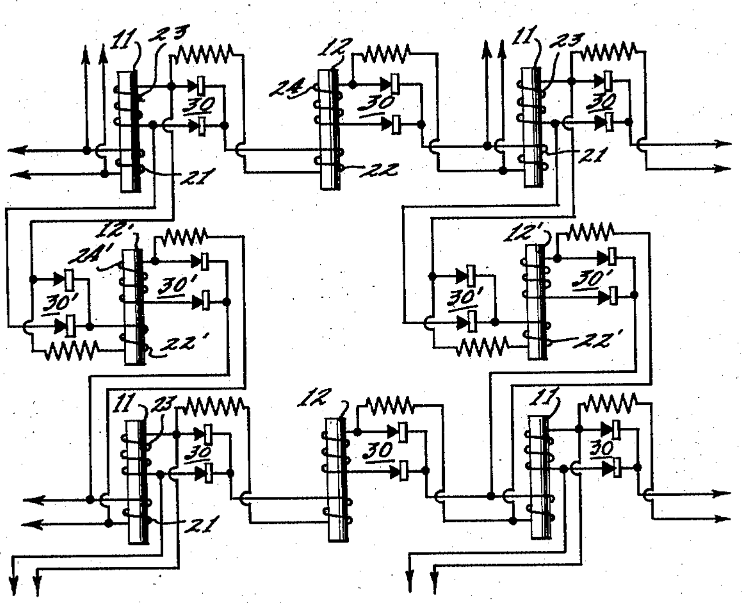
Figure 6 is a circuit diagram of a modification of the embodiment shown in Figure 4.

Referring now to Figure 6, there is shown a circuit diagram of a modification of the embodiment shown in Figure 4. The storage 11 and transfer 12, 12′ cores are arranged in the same way in matrix form. However, the second output 23′ and input 21′ coils on each storage core 11 are eliminated. To the leads of the output coil 23 of each storage core 11 two unidirectional circuits 30, 30′ are connected in parallel. One of the circuits 30 is connected to the input coil 22 of the succeeding transfer core 12 in the same row, and, correspondingly, the other 30′ to the input coil 22′ of the succeeding column transfer core 12′. Likewise, the input coil 21 on each storage core 11 is connected through unidirectional circuits 30, 30′ to the output coils of the preceding row and column transfer cores 12, 12′. Instead of using two circuits 30, 30′ in parallel to couple the output coil 23 of each storage core 11 to the input coils 22, 22′ of the succeeding transfer cores 12, 12′, a single circuit may be used with the input coils connected in series in the circuit.

The operation and construction is otherwise the same as in Figure 4. Advancing coils are wound on each core and connected to three advancing lines (not shown). With a steady current applied to the advancing coils of the column transfer cores, and advancing pulses applied to the advancing coils of the row transfer cores and the storage cores, the row relay lines are activated and the column transfer paths are blocked. Interchanging the type of signal current applied to the advancing coils on the row and column transfer cores activates the column delay lines and blocks the row delay lines.

One of the applications of the present matrix form of delay line lies in its ability to receive information arranged in columns and send out the information rearranged in the form of rows with corresponding elements of each column in the same row. For example, information is stored on punch cards in matrix form with several times more columns than rows. The information may be read off the cards in rows, and the delay line described above can be used to convert the arrangement of information to the corresponding columns.

With the delay line of this invention, parallel information stored on several record tapes may be collated and collected. The information on each tape may be fed into a column of the delay line. Correspondingly positioned information bits are stored in cores in the same row. Reading out each row then provides the desired collection of information.

Figure 7:
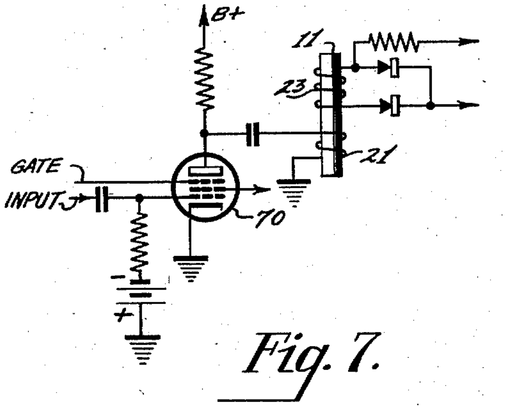
Figures 7 and 8 show input and output circuits respectively for a static magnetic delay line.
Figure 8:
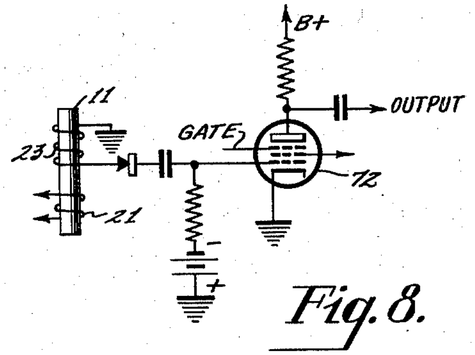

Suitable input and output devices for the first storage core 11 in each column and the last storage core 11 in each row are shown in Figures 7 and 8 respectively. The input line is coupled to the control grid of a pentode 70, and a lead of the input coil 21 on a storage core 11 is coupled to the anode of the tube 70. The output device is similarly constructed with the output coil 23 on a storage core 11 coupled to the control grid of another pentode 72 and the output line coupled to the anode of the tube 72. Switching is provided by connecting the suppressor grids of the tubes to a gating circuit. The input 70 or output 72 tube in each column or row is conditioned for conduction according to the column or row delay lines are activated to read information in or out. The gate may be a bistable multivibrator that responds to an instruction signal and applies the appropriate potentials to the suppressor grids of the tubes. For example, the same electronic switch that is used in the embodiments of Figures 4 and 5 to control the activation and blocking of the transfer paths may be used to control the input 70 and output 72 tubes.

To summarize: Each of the embodiments has a matrix of storage cores arranged in columns and rows. Each storage core is coupled to the succeeding storage core in the same row by a transfer path which comprises a magnetic transfer core and a unidirectional coupling circuit. Each storage core is also coupled to the succeeding storage core in the same column by a transfer path which may include portions of the row transfer path. The series of storage cores and transfer paths in each row or column along with advancing means constitute a delay line. Control means are provided to isolate the operations in the row and column delay lines from each other so that the transfer of information may take place independently along the columns or rows. In one embodiment, the control means comprise switches which open and close the circuits in the transfer paths. In another embodiment, control of the transfer of information is by the type of signal applied to the transfer cores through the advancing means, whereby either the column or row transfer paths may be blocked and the others advanced.

It is evident that there has been provided a simple static magnetic delay line having a multidirectional mode of operation. The utility of the delay line has been increased with a relatively small increase in structure. Considered in another way a plurality of static magnetic delay lines have been cross-coupled to produce an integrated delay line with increased functions. A novel arrangement of storage and transfer elements in a delay line permits the conversion of columns of information to corresponding rows of information.

What is claimed is:

1. A multidirectional storage system comprising a first delay line having an input and an output and including first means for transferring information along said first delay line, a second delay line having an input and an output and including second means for transferring information along said second delay line, means for coupling said first and second delay lines for transferring information in one of said delay lines to the other, and means for activating and deactivating said first and second transferring means whereby the transfer operation may be switched alternatively to said first or second transferring means.

2. A multidirectional static magnetic storage comprising a plurality of magnetic storage cores operatively arranged in first and second series, one of said cores being common to both series, each of said series individually including at least two of said cores other than said common core, a first path for transferring information in one direction, said path coupling said cores in said first series, a second path for transferring information in a second direction, said second path coupling said cores in said second series, and means for switching said direction of transfer alternatively to said first or second directions including means for activating and deactivating said paths.

3. A multidirectional static magnetic storage as recited in claim 2 wherein said first and second paths have common portions.

4. A multidirectional static magnetic storage as recited in claim 2 wherein said first and second paths are mutually exclusive.

5. A multidirectional storage comprising a plurality of discrete storage elements operatively arranged in columns, said elements also being operatively arranged in rows, a first series of delay lines arranged in parallel, each said delay line including one of said columns of storage elements, and means for transferring information along each of said columns of storage elements including a path coupling the elements of each of said columns; and a second series of delay lines, each said second delay line including one of said rows of storage elements, and means for transferring information along each of said rows of storage elements including a path coupling the elements of said row.

6. A multidirectional storage as recited in claim 5 wherein said means for transferring information along each column and said means for transferring information along each row include a plurality of transfer elements arranged in said columns and rows, one transfer element between each pair of storage elements, each said path including the transfer elements in its associated column or row.

7. A multidirectional storage as recited in claim 5 including switch means for activating and deactivating said coupling paths.

8. An information matrix storage system comprising a plurality of storage elements operatively arranged in columns and rows to form a matrix, a separate path associated with each said column and row for transferring information along its associated column or row, each said path coupling the storage elements of its associated column or row, means for reading said information into said columns in parallel, means for serially advancing said information along said columns and rows of elements, means for reading said information out of said rows in parallel, and means for activating and deactivating the transfer paths associated with said columns and correspondingly deactivating and activating the transfer paths associated with said rows.

9. A static magnetic delay line comprising a plurality of magnetic storage cores operatively arranged in columns as column cores and in rows as row cores, means coupled to said column cores for reading information into said column cores in parallel, means coupled to said column cores in series for transferring said information along said column cores in series, means coupled to said row cores in series for transferring said information along said row cores in series, and means for controlling the direction of transfer.

10. A static magnetic delay line as recited in claim 9 including means for reading said information out of said row cores in parallel, said reading out means being coupled to said row cores in parallel.

11. A static magnetic delay line as recited in claim 10 wherein said control means has two conditions, said transferring means being responsive to one of said control conditions for transferring information along said columns and responsive to the other control condition for transferring information along said rows.

12. A static magnetic storage comprising a plurality of magnetic storage cores operatively arranged in columns, said cores also being operatively arranged in rows, a plurality of magnetic transfer cores, and a transfer path for each adjacent pair of storage cores in the same row or column including one of said transfer cores as well as winding means coupling said one transfer core to said adjacent pair of storage cores.

13. A static magnetic storage comprising a plurality of magnetic storage cores operatively arranged in columns, said cores also being operatively arranged in rows, a plurality of magnetic transfer cores, a transfer path for each adjacent pair of storage cores in the same row or column including one of said transfer cores as well as means coupling said one transfer core to said adjacent pair of storage cores, a first means for transmitting advancing signals to said storage cores, and a second means for transmitting advancing signals to said transfer cores.

14. A static magnetic storage comprising a plurality of magnetic storage cores operatively arranged in columns, said cores also being operatively arranged in rows, a plurality of magnetic transfer cores, and a transfer path for each adjacent pair of storage cores in the same row or column including one of said transfer cores as well as means coupling said one transfer core to said adjacent pair of storage cores, and means for conditioning said paths for transfer alternatively along said rows or along said columns including switch means for activating and deactivating said paths.

15. A static magnetic storage as recited in claim 14 wherein said switch means make and break said coupling means.

16. A static magnetic storage as recited in claim 14 wherein said conditioning means include means for actuating and blocking transfer of information along said paths, said switch means controlling said actuating and blocking means.

17. In a series of static magnetic delay lines arranged in parallel for storing columns of information in matrix form, each said delay line comprising a series of magnetic storage cores, a series of magnetic transfer cores, means coupling said cores in series, each said transfer core being coupled to a pair of storage cores, and means for reading a column of information into the first storage core of each said delay line; means for converting said columns of information to the rows of information formed in said matrix comprising means coupling each said storage core in each said delay line to the correspondingly positioned storage core in the adjacent delay line to form a second transverse series of delay lines, said coupling means including magnetic transfer cores, each said latter transfer core being coupled to a pair of the correspondingly positioned storage cores, means for reading a row of information out of the last storage core of each said transverse delay line, means for actuating transfer of information along said delay lines, and control means for alternatively directing said transfer of information along said first-mentioned delay lines or along said transverse delay lines.

18. A multidirectional static magnetic delay line comprising a first group of magnetic storage cores operatively arranged in columns and rows, a second group of said cores operatively arranged in said columns and rows alternately with said first group cores, each said core having an input winding and an output winding, means for transferring information serially along said columns and rows comprising a first set of circuits coupling said input winding of each said second group core with said output winding of the preceding first group core in the same column or row, and a second set of circuits coupling said output winding of each said second group core with said input winding of the succeeding first group core in the same column or row, switch means in each circuit of one of said sets for alternatively completing the circuits along said rows or along said columns, and means for actuating the transfer of information along said columns and rows.

19. A multidirectional static magnetic delay line comprising a first group of magnetic storage cores operatively arranged in columns and rows, each said core having input windings, output windings and advancing windings, a second group of said cores operatively arranged in said columns and rows alternately with said first group cores, each said second group core having input windings, output windings, and advancing windings, means for transferring information serially along said columns and rows comprising circuits linking respectively said output and input windings of each said first group core with said input and output windings of the succeeding and preceding second group cores in the same column and row, first and second advancing lines for transmitting advancing signals to said advancing windings, said first lines being coupled to said first group advancing windings, said second lines being coupled to said second group advancing windings, and control means for directing blocking signals to said second group advancing windings, said control means being coupled to said second advancing lines.

20. A magnetic system comprising a plurality of magnetic elements operatively arranged in a first series, a different plurality of magnetic elements operatively arranged in a second series, another magnetic element operatively arranged in common in both of said series, means coupling said elements in said first series for transfer of information therealong, means coupling said elements in said second series for transfer of information therealong, and means for actuating the transfer of information alternatively along either of said series of elements.

21. A magnetic-core shifting switch comprising a first, a second, and a third column of magnetic cores, each of said cores being substantially saturable in either of two polarities, a plurality of first inductive coupling means each of which inductively couples a different one of the cores of said second column with a different one of the cores of said first column, each of said first means including a unilateral current flow means, a plurality of second inductive coupling means each of which inductively couples a different one of the cores of said second column with a different one of the cores of said third column, each of said second means including a unilateral current flow means, a plurality of third inductive coupling means each of which inductively couples a different one of the cores of said third column with a different one of the cores of said second column other than the core to which each said third column core is already coupled, each of said third means including a unilateral current flow means, means to apply a drive to said second and first columns of cores to drive said cores toward core saturation at one of said two polarities, and means to apply a drive to said first and third columns of cores to drive said cores toward core saturation at the other of said two polarities.

References Cited in the file of this patent

UNITED STATES PATENTS

| | | |
|---|---|---|
| 1,832,118 | Hershey | Nov. 17, 1931 |
| 2,246,449 | Marshall | June 17, 1941 |
| 2,308,778 | Prince | Jan. 19, 1943 |
| 2,386,743 | May | Oct. 9, 1945 |
| 2,410,540 | Wight | Nov. 5, 1946 |
| 2,519,513 | Thompson | Aug. 22, 1950 |
| 2,574,438 | Rossi | Nov. 6, 1951 |
| 2,591,406 | Carter | Apr. 1, 1952 |

(Other references on following page)

UNITED STATES PATENTS

| | | |
|---|---|---|
| 2,591,931 | Grosdoff | Apr. 8, 1952 |
| 2,617,704 | Mallina | Nov. 11, 1952 |

OTHER REFERENCES

"Magnetic Cores as Elements of Digital Computing Systems," a Thesis by Monroe K. Haynes, University of Illinois, Dec. 28, 1950.

An Wang: (1) "Static Magnetic Storage," vol. 21, Journal of Applied Physics, January 1950, pg. 49–54.

An Wang: (2) "Magnetic Triggers," pp. 626–632, vol. 38, Proceedings of the IRE, June 1950.

"Magnetic Cores as Elements of Digital Computing Systems," a Thesis by Monroe K. Haynes, University of Illinois, Dec. 28, 1950.